United States Patent
Müller et al.

(10) Patent No.: US 6,213,576 B1
(45) Date of Patent: Apr. 10, 2001

(54) WINDOW UNIT

(75) Inventors: Matthias Müller, Haiger; Udo Münch, Sinn; Heinz Schmitt, Dietzhölztal; Jörg Wirbelauer, Weilburg, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/293,686

(22) Filed: Apr. 16, 1999

(30) Foreign Application Priority Data

Apr. 17, 1998 (DE) ................................ 198 17 918

(51) Int. Cl.⁷ ....................................... A47F 3/00
(52) U.S. Cl. ...................... 312/223.1; 312/138.1
(58) Field of Search ................ 52/204.5, 220.1, 52/36.5; 49/504; 312/223.1, 102, 101, 265.4, 138.1, 265.3, 329

(56) References Cited

U.S. PATENT DOCUMENTS

| | | | | |
|---|---|---|---|---|
| 3,279,871 | * | 10/1966 | Bright | 312/223.1 |
| 4,862,324 | * | 8/1989 | Kalvaitis et al. | 312/223.1 X |
| 5,147,981 | * | 9/1992 | Buet et al. | 312/223.1 X |
| 5,232,277 | * | 8/1993 | Cassady et al. | 312/223.1 X |
| 5,536,079 | * | 7/1996 | Kostic | 312/223.1 X |
| 5,638,648 | * | 6/1997 | Rotondo | 312/223.1 X |
| 5,761,797 | * | 6/1998 | Besserer et al. | 312/223.1 X |
| 5,905,631 | * | 5/1999 | Winkler | 312/223.1 X |

\* cited by examiner

*Primary Examiner*—David M. Purol
(74) *Attorney, Agent, or Firm*—Pauley Petersen Kinne & Fejer

(57) ABSTRACT

A window unit installed on a trim element of a switchgear cabinet. The window unit contains a window element that is coupled to the trim element in pivoted fashion. In order to allow a simple mounting of the window unit on the trim element, a frame is attached to and mounted on the trim element, and the window element is hinged to the frame.

12 Claims, 2 Drawing Sheets

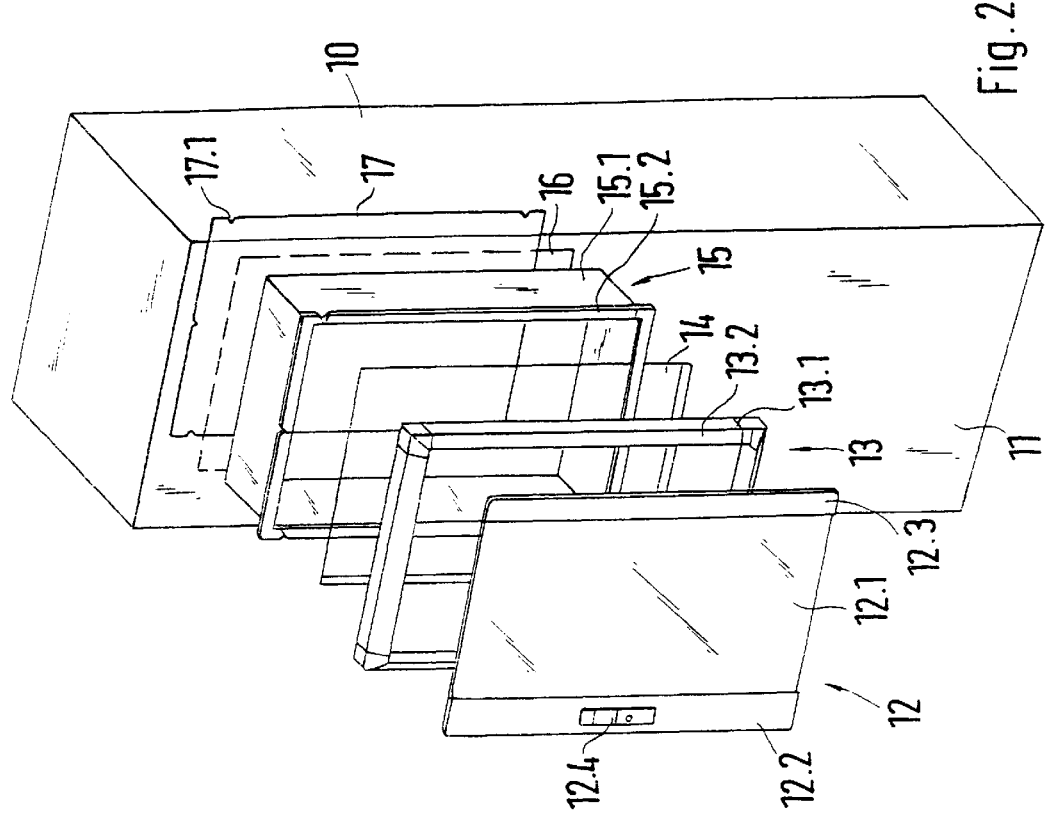
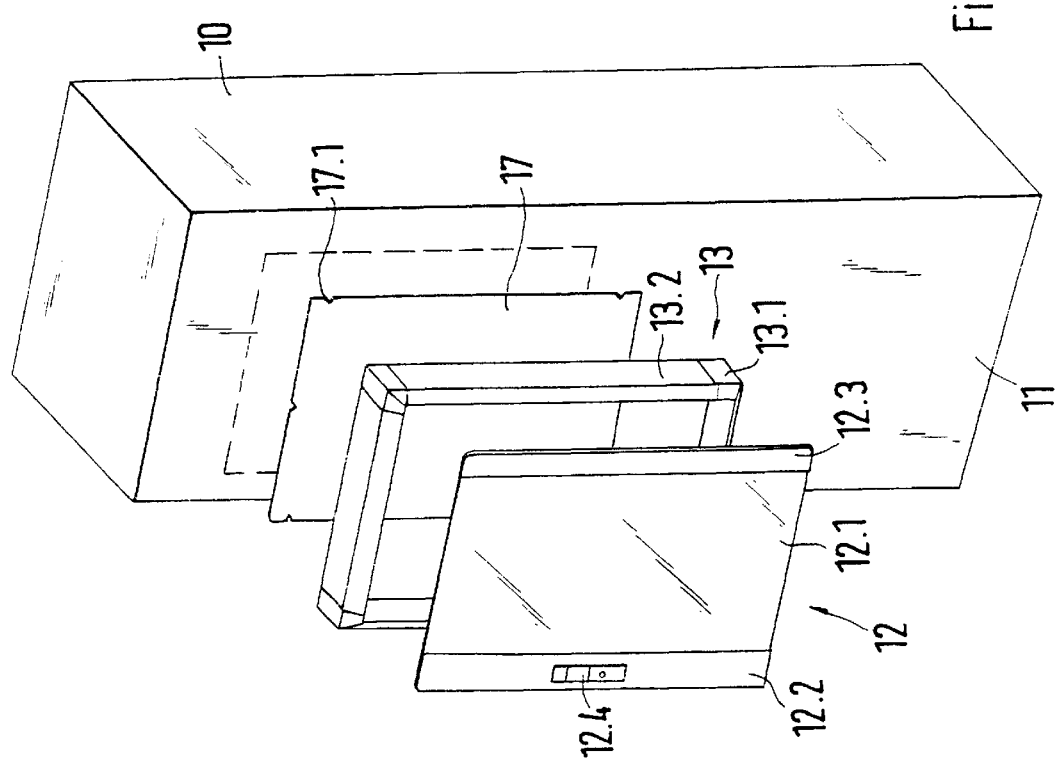

WINDOW UNIT

BACKGROUND OF THE INVENTION

1. Field of the Invention

This invention relates to a window unit that is installed on a trim element of a switchgear cabinet, wherein the window unit contains a window element that is coupled to the trim element in a pivoted fashion.

2. Description of Prior Art

Window units of this type contain a window pane that is bordered by a frame along its edges, wherein the frame carries hinges. Openings are arranged in the trim element in order to attach the window unit. The hinges are inserted into the openings and subsequently mounted therein. The trim element contains a cutout behind the window pane. On a rear side of the trim element, a box covers the cutout, in which electrical components are accommodated. These installations are visible through the window pane of the window element and can, if so required, be accessed when the window unit is open.

The attachment of such a window unit needs to be carried out carefully. The hinges need to be arranged on the trim element in such a way that the hinge axes are aligned with one another. This means that it is relatively complicated to retrofit an existing switchgear cabinet with a window unit. In addition, the cutout in the trim element disadvantageously affects the stability and stiffness of the trim element.

SUMMARY OF THE INVENTION

This invention is based on one objective of developing a window unit of the initially mentioned type which can be easily mounted on a trim element.

This objective is achieved with a frame that is attached to and mounted on the trim element, and the window element is hinged to the frame. The frame as well as the window element hinged thereon form one structural unit that can be premanufactured. This structural unit can then be attached to the trim element, for example, by means of screws. This can be easily realized because no special dimensional tolerances need to be observed. Consequently, an existing switchgear cabinet can be easily retrofitted with a window unit. If a cutout is provided in the trim element, the frame stiffens the trim element.

The frame which is mounted on the trim element has a stiffening effect, for example, a cutout does not or only insignificantly impairs the stability of the trim element.

However, it is not absolutely imperative to arrange a cutout in the trim element for the window unit according to this invention. The frame may be realized in such a way that it holds the window element at a distance from the front side of the trim element. In this case, mounting and installation space is created in front of the trim element.

According to one preferred embodiment of this invention, the window element contains a window pane that has edge profiles on at least two sides, wherein one edge profile carries hinges for connecting the window pane to the frame, and wherein the second edge profile has a locking device. In this case, the edge profiles may be realized in the form of separate parts that can be subsequently fastened to the window pane, for example, by bonding. However, it would also be conceivable to directly incorporate the edge profiles on the window pane.

In another variation of this invention the frame carries a mounting plate that is arranged parallel to and at a distance from the window element in the closed position of the window element and can be equipped with electric components. The mounting plate can be separately equipped and wired. Subsequently, the mounting plate can be attached to the frame. The formed window unit can then be attached to the trim element. The mounting plate may, for example, also have an engraved or printed circuit at the manufacturing site.

In order to increase the installation space surrounded by the window unit, it would be conceivable to install a spacer frame on the frame. In this case, the spacer frame holds the mounting plate parallel to and at a distance from the closed window element within its region that faces away from the frame.

In order to achieve an appealing optical appearance, in one embodiment of the window unit according to this invention, the frame is inserted into the cutout of the trim element, wherein the frame adjoins the front side of the trim element around the cutout with a circumferential, laterally protruding edge.

In order to simplify mounting of the window unit, a tubular door frame may be fastened to the rear side of the trim element that is realized in the form of a cabinet door, wherein the tubular door frame contains a pattern of fastening receptacles, and wherein fastening screws extend through the fastening receptacles and are screwed into the frame. The fastening receptacles of the tubular door frame are used as a drilling template for the frame because the fastening receptacles of the frame need to be adapted to the pattern of fastening receptacles on the tubular door frame.

BRIEF DESCRIPTION OF THE DRAWINGS

This invention is described in greater detail below with reference to one embodiment that is illustrated in the figures, wherein:

FIG. 1 is a perspective view of a switchgear cabinet with an exploded view of a window unit;

FIG. 2 is a perspective view of a switchgear cabinet according to FIG. 1 with an exploded view of a window unit;

DESCRIPTION OF PREFERRED EMBODIMENTS

Figure 3:
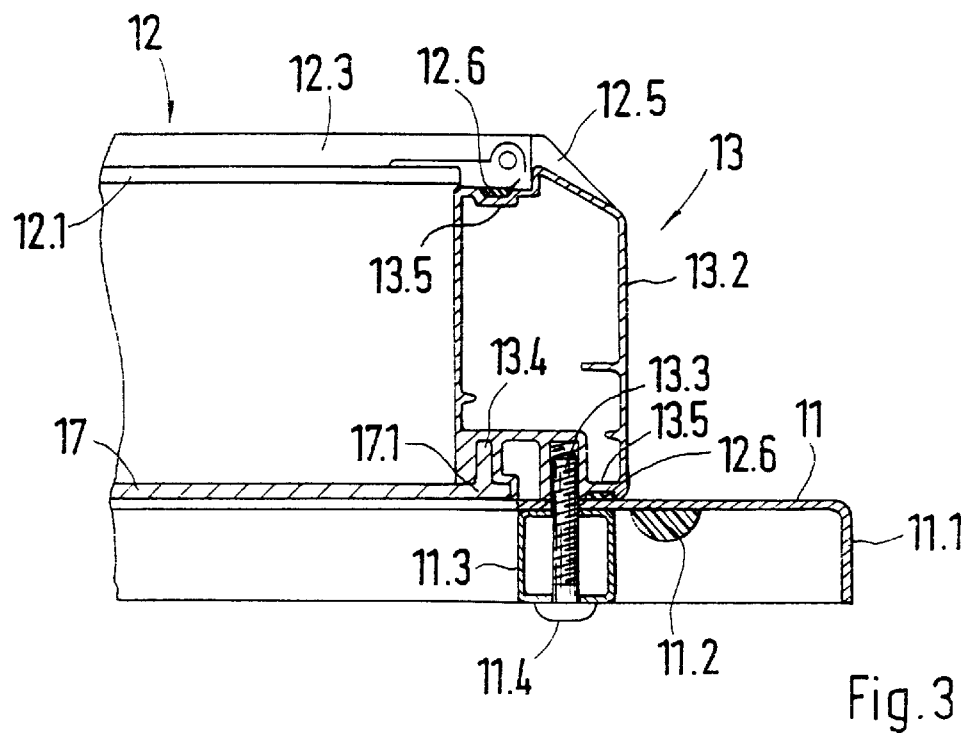
FIG. 3 is an enlarged partial horizontal section taken through the edge region of the window unit according to FIG. 1.

FIG. 1 shows a schematic representation of the cabinet body 10 of a switchgear cabinet. The cabinet body 10 has trim elements 11 on its sides. A window unit can be fastened to the front trim element 11, for example, the cabinet door. In this case, the window unit comprises a frame 13, a window element 12 and a mounting plate 17. The frame 13 contains four profile sections 13.2 that are connected to one another in the corners of the frame by means of corner elements 13.1. The cross-sectional shape of a profile section 13.2 is illustrated in greater detail in FIG. 3. According to FIG. 3, a profile section 13.2 is formed as an extruded profile. On its side that faces the trim element 11, the profile section 13.2 contains two grooves that extend in the longitudinal direction of the profile section 13.2 and serve as thread receptacles 13.3, 13.4. Within a region in which it adjoins the trim element 11, the profile section 13.2 has a seal receptacle 13.5. A seal 12.6 can be inserted into this receptacle. On its side that faces away from the trim element 11, the profile section 13.2 has one additional seal receptacle 13.5 formed as of a groove. A seal 12.6 that seals the window unit 12 can be inserted into the receptacle 13.5.

FIG. 1 also shows that the window element 12 contains a window pane 12.1 having edge profiles 12.2, 12.3 on both vertically extending edges. The edge profile 12.2 carries a locking device 12.4. The locking device 12.4 may, for example, carry a two-way key bit equipped with a sash fastener. In the closed position, this sash fastener engages behind a corresponding edge of the frame 13. The edge profile 12.3 is equipped with hinges 12.5 as shown in FIG. 3. The hinges 12.5 are fastened on the corresponding vertical profile section 13.2 of the frame 13. The vertically extending hinge axis is held in front of the profile section 13.2 in this case. Due to this measure, the window element 12 can be pivoted open about 180°. Consequently, optimal access to the mounting space surrounded by the frame 13 is ensured.

The mounting plate 17 can be fastened on the frame 13. For this purpose, the mounting plate 17 has recesses 17.1 on its edge. Fastening screws that extend through the recesses 17.1 can be screwed into the thread receptacle 13.4 of the profile sections 13.2. In order to simplify the attachment of the mounting plate 17, the frame 13 has an inner receptacle, the dimensions of which are adapted to the outer geometry of the mounting plate 17. Electrical components may be accommodated on the mounting plate 17. These electrical components can be mounted and functionally wired to one another before the mounting plate 17 is attached. The unit comprising the window element 12, the frame 13 and the mounting plate 17 can then be fastened on the trim element 11. FIG. 3 also shows that the trim element 11 which is formed as a cabinet door in this embodiment contains a circumferential angled section 11.1 on its edge. A seal 11.2 is formed onto the inner side of the trim element 11 parallel to and at a distance from this angled section 11.1. Adjacent to this seal 11.2, a tubular door frame 11.3 stiffens the trim element 11. The tubular door frame 11.3 contains two vertical crossbeams that have a pattern of fastening receptacles in the longitudinal direction. These fastening receptacles serve as a drilling template for attaching the window unit. Fastening screws 11.4 can be inserted into the fastening receptacles of the tubular door frame 11.3 and screwed into the thread receptacles 13.3 of the frame. Consequently, the frame 13 is reliably and rigidly fixed in the trim element 11.

Figure 4:
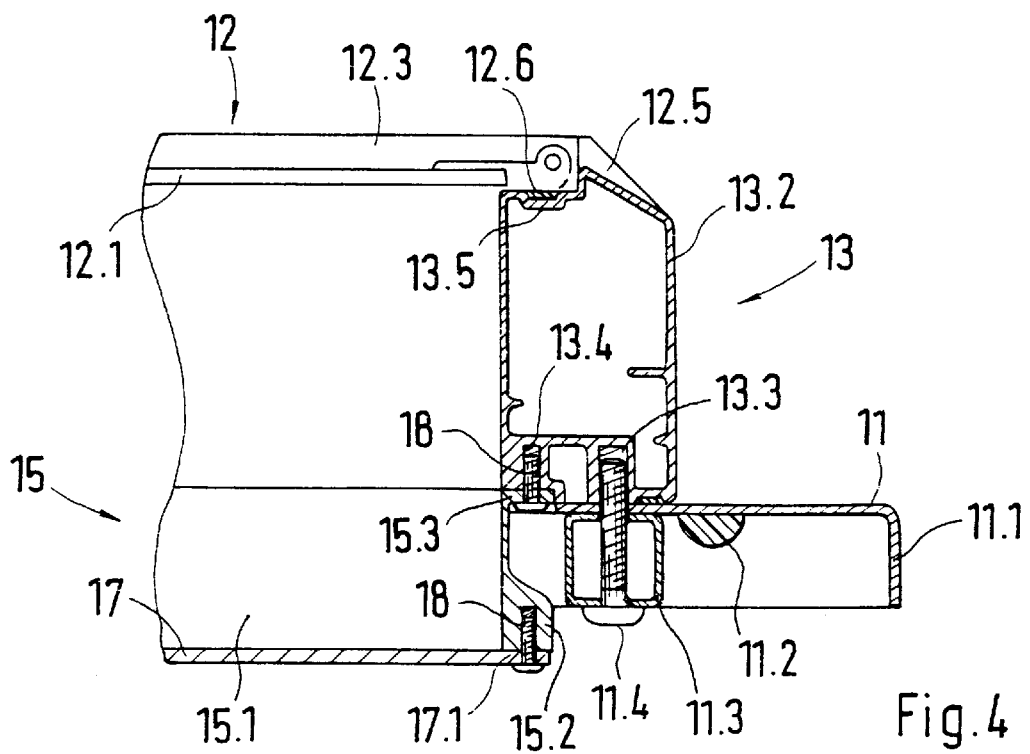
FIG. 4 is an enlarged partial horizontal section taken through the edge region of the window unit according to FIG. 2.

FIG. 2 shows an expanded window unit. According to this embodiment, the window unit is supplemented with a spacer frame 15. The spacer frame 15 comprises four extruded profiles. The spacer frame 15 contains a wall 15.1, from which an edge 15.2 protrudes. The spacer frame 15 can be inserted into a cutout 16 in the trim element 11. The fastening of the spacer frame 15 on the frame 13 is shown in greater detail in FIG. 4. According to FIG. 4, the spacer frame 15 contains a flange 15.3 that has fastening receptacles within an end region that faces the frame 13. Fastening screws 18 can be inserted into the fastening receptacles and screwed into the thread receptacles 13.4 of the frame 13. The wall 15.1 of the spacer frame 15 increases the installation depth of the window unit. The rear side of the spacer frame 15 can be closed with the mounting plate 17. For this purpose, thread receptacles 18 are machined into the edge 15.2. Fastening screws 18 extend through recesses 17.1 in the mounting plate 17 and can be screwed into the thread receptacles of the edge 15.2.

We claim:

1. In a window unit installed on a trim element of a switchgear cabinet, with a window element pivotally coupled to the trim element, the improvement comprising:
a frame (13) attached to and mounted on the trim element (11), the window element (12) hingedly connected to the frame (13), the trim element (11) having a cutout (16), the frame (13) inserted within the cutout (16), and a circumferential laterally protruding edge of the frame (13) adjoining a front side of the trim element (11).

2. In a window unit according to claim 1, wherein the window element (12) has a window pane (12.1) with a plurality of edge profiles (12.2, 12.3) on at least two sides of the window element (12), wherein on one of the edge profiles (12.3) a plurality of hinges (12.5) attach the window pane (12.1) to the frame (13), and wherein a locking device (12.4) is mounted on a second of the edge profiles (12.2).

3. In a window unit according to claim 2, wherein a mounting plate (17) fastened on the frame (13) is arranged parallel to and at a distance from the window element (12) in a closed position of the window element (12) with respect to the frame (13) and a plurality of electrical components are mounted on the mounting plate (17).

4. In a window unit according to claim 3, wherein a spacer frame (15) is surrounded by and attached to the frame (13).

5. In a window unit according to claim 4, wherein the spacer frame (15) holds the mounting plate (17) parallel to and at a distance from the window element (12) in the closed position.

6. In a window unit according to claim 1, wherein a mounting plate (17) fastened on the frame (13) is arranged parallel to and at a distance from the window element (12) in a closed position of the window element (12) with respect to the frame (13) and a plurality of electrical components are mounted on the mounting plate (17).

7. In a window unit according to claim 1, wherein a spacer frame (15) is surrounded by and attached to the frame (13).

8. In a window unit according to claim 7, wherein the spacer frame (15) holds a mounting plate (17) parallel to and at a distance from the window element (12) in a closed position of the window element (12) with respect to the frame (13).

9. In a window unit according to claim 1, wherein the frame (13) comprises four profile sections (13.2) arranged perpendicular to one another in each of four corner areas, wherein the profile sections (13.2) are connected with a plurality of corner elements (13.1) in the corner areas, and the profile sections (13.2) each have a thread receptacle (13.3) used to fasten the profile sections (13.2) on the trim element (11).

10. In a window unit installed on a trim element of a switchgear cabinet, with a window element pivotally coupled to the trim element, the improvement comprising:
a frame (13) attached to and mounted on the trim element (11), the window element (12) hingedly connected to the frame (13), the window element (12) having a window pane (12.1) with a plurality of edge profiles (12.2, 12.3) on at least two sides of the window element (12), on one of the edge profiles (12.3) a plurality of hinges (12.5) attaching the window pane (12.1) to the frame (13), a locking device (12.4) mounted on a second of the edge profiles (12.2), a mounting plate (17) fastened on the frame (13) arranged parallel to and at a distance from the window element (12) in a closed position of the window element (12) with respect to the frame (13), a plurality of electrical components mounted on the mounting plate (17), a spacer frame (15) surrounded by and attached to the frame (13), the spacer frame (15) holding the mounting plate (17) parallel to and at a distance from the window element

(12) in the closed position, the frame (13) having four profile sections (13.2) arranged perpendicular to one another in each of four corner areas, the profile sections (13.2) connected with a plurality of corner elements (13.1) in the corner areas, and the profile sections (13.2) each having a thread receptacle (13.3) used to fasten the profile sections (13.2) on the trim element (11).

11. In a window unit according to Claim 10, wherein a tubular door frame (11.3) having a plurality of fastening receptacles is fastened on a rear side of the trim element (11), and a plurality of fastening screws extend through the fastening receptacles and are screwed into the frame (13).

12. In a window unit installed on a trim element of a switchgear cabinet, with a window element pivotally coupled to the trim element, the improvement comprising:

a frame (13) attached to and mounted on the trim element (11), the window element (12) hingedly connected to the frame (13), a tubular door frame (11.3) having a plurality of fastening receptacles fastened on a rear side of the trim element (11), and a plurality of fastening screws extending through the fastening receptacles and screwed into the frame (13).

* * * * *